US009500199B2

(12) United States Patent
Joergl

(10) Patent No.: US 9,500,199 B2
(45) Date of Patent: Nov. 22, 2016

(54) EXHAUST TURBOCHARGER OF AN INTERNAL COMBUSTION ENGINE

(75) Inventor: Volker Joergl, Breitenfurt (AT)

(73) Assignee: BorgWarner Inc., Auburn Hills, MI (US)

( * ) Notice: Subject to any disclaimer, the term of this patent is extended or adjusted under 35 U.S.C. 154(b) by 374 days.

(21) Appl. No.: 13/876,865

(22) PCT Filed: Oct. 7, 2011

(86) PCT No.: PCT/US2011/055235
§ 371 (c)(1),
(2), (4) Date: Mar. 29, 2013

(87) PCT Pub. No.: WO2012/051062
PCT Pub. Date: Apr. 19, 2012

(65) Prior Publication Data
US 2013/0195619 A1 Aug. 1, 2013

(30) Foreign Application Priority Data
Oct. 11, 2010 (DE) .......................... 10 2010 048 142

(51) Int. Cl.
| F01K 23/10 | (2006.01) |
| F02G 3/00 | (2006.01) |
| F02B 33/44 | (2006.01) |
| F04D 19/00 | (2006.01) |
| F01K 23/06 | (2006.01) |

(Continued)

(52) U.S. Cl.
CPC ............. *F04D 19/00* (2013.01); *F01K 23/065* (2013.01); *F01N 5/02* (2013.01); *F01N 13/10* (2013.01); *F02B 37/18* (2013.01); *F01N 2560/06* (2013.01); *Y02T 10/144* (2013.01); *Y02T 10/16* (2013.01)

(58) Field of Classification Search
CPC ....... F01K 23/065; F02B 37/18; Y02T 10/16
USPC ..................... 60/605.1, 605.3, 614–620, 321
See application file for complete search history.

(56) References Cited

U.S. PATENT DOCUMENTS 1,803,436 A * 5/1931 Otwell ...................... 237/12.3 A
4,884,406 A * 12/1989 Kawamura .................. 60/605.3
(Continued)

FOREIGN PATENT DOCUMENTS

DE          2614956 B1 * 10/1977 .............. F02B 37/04

OTHER PUBLICATIONS

International Search Report and Written Opinion date of mailing May 2, 2012 : for International Application No. PCT/US2011/056235 ; 9 pages.

(Continued)

*Primary Examiner* — Kenneth Bomberg
*Assistant Examiner* — Ngoc T Nguyen
(74) *Attorney, Agent, or Firm* — BrooksGroup

(57) ABSTRACT

The invention relates to an exhaust turbocharger (1) of an internal combustion engine (2) having a compressor (3), and having a turbine (4), which comprises a turbine housing (5), wherein the turbine housing (5) comprises an evaporator (6), to which heat deriving from the exhaust gases of the internal combustion engine (2) can be admitted for the evaporation of a working fluid, and wherein the evaporator (6) is flow-connected to a line arrangement (7), in which a steam turbine (8) and downstream of that a condenser (9) are arranged, viewed in the direction of flow (S) of the working fluid.

10 Claims, 1 Drawing Sheet

(51) Int. Cl.
*F01N 5/02* (2006.01)
*F01N 13/10* (2010.01)
*F02B 37/18* (2006.01)

(56) References Cited

U.S. PATENT DOCUMENTS

| | | | |
|---|---|---|---|
| 6,209,390 B1* | 4/2001 | LaRue et al. | 73/112.01 |
| 6,513,328 B2* | 2/2003 | Baeuerle et al. | 60/605.1 |
| 7,104,120 B2* | 9/2006 | Gladden | 73/114.77 |
| 7,475,541 B2 | 1/2009 | Ibaraki et al. | |
| 8,621,865 B2* | 1/2014 | Mehring et al. | 60/605.3 |
| 8,881,711 B1* | 11/2014 | Jasper | 123/550 |
| 2004/0112054 A1 | 6/2004 | Larsson et al. | |
| 2004/0231330 A1 | 11/2004 | Ibaraki et al. | |
| 2008/0116691 A1 | 5/2008 | Lin | |
| 2009/0211253 A1* | 8/2009 | Radcliff et al. | 60/670 |
| 2010/0146967 A1 | 6/2010 | Simpson et al. | |
| 2010/0146969 A1* | 6/2010 | Stiermann | 60/616 |
| 2010/0199631 A1 | 8/2010 | Vilimec et al. | |

OTHER PUBLICATIONS

Chinese Office Action dated Sep. 28, 2014; Application No. 201180046532.3 ; Applicant : BorgWarner Inc.; 14 pages.
Chinese Office Action dated Jun. 9, 2015; Application No. 201180046532.3 ; Applicant : BorgWarner Inc.; 5 pages.

* cited by examiner

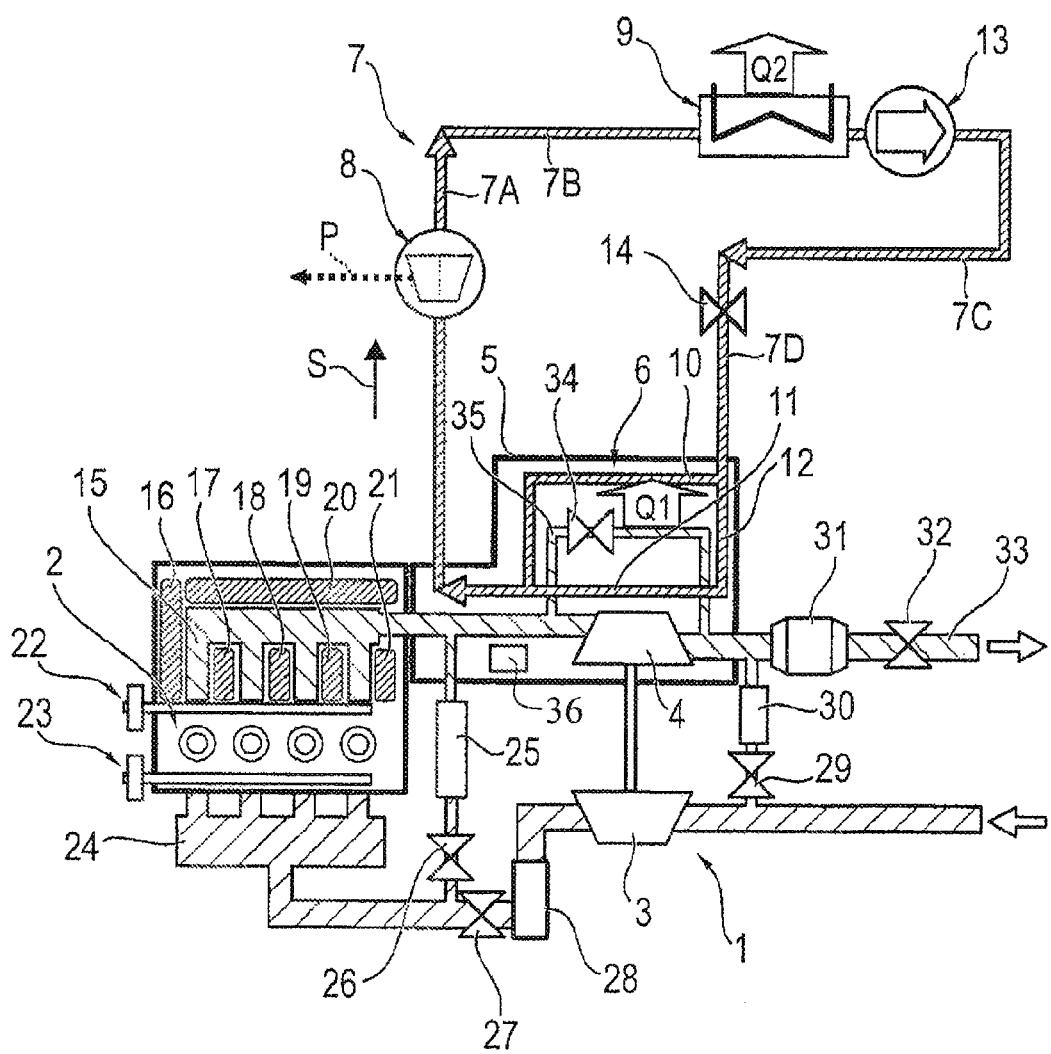

EXHAUST TURBOCHARGER OF AN INTERNAL COMBUSTION ENGINE

The invention relates to an exhaust turbocharger of an internal combustion engine according to the preamble of claim 1.

The Rankine cyclical process is basically suited to utilizing the waste heat from exhaust turbochargers and/or internal combustion engines, the amount of energy available under different engine load and speed conditions and the temperature level being the key to highly efficient use of such a Rankine process.

In existing solutions exhaust gas recirculation coolers, for example, or large and expensive heat exchangers have been proposed as additional equipment for the exhaust system, in order to provide enough energy, for example, to achieve a significant improvement in the fuel consumption using the Rankine process.

As the existing solutions are unsatisfactory, however, since besides high costs they represent additional measures taking up a lot of overall space, such as the aforementioned coolers and heat exchangers, the object of the present invention is to create an exhaust turbocharger of the type specified in the preamble of claim 1, which will allow a highly efficient utilization of the waste heat from the turbocharger/internal combustion engine system.

This object is achieved by the features of claim 1.

In contrast to the state of the art, which relies on the use of additional units, according to the invention the turbine housing and/or in an especially preferred further embodiment the exhaust manifold is used as heat exchanger, since this affords an extremely space-saving and more cost-effective possibility of utilizing the waste heat from the exhaust turbocharger and/or the internal combustion engine in terms of the integration of a Rankine process.

In particular, according to the invention the principles of wall heat conduction can be used to transmit heat from the exhaust gas to the turbine housing or the exhaust manifold, in order to evaporate the working fluid.

The working fluid is accordingly evaporated in the evaporator of the turbine housing and then expanded in a steam turbine of the line arrangement operatively connected to the evaporator, following which it is converted via the condenser into the liquid state and returned into the turbine housing, in order to repeat the cycle previously described of evaporation, expansion, condensation and return of the working fluid.

Besides driving the turbine and thereby the exhaust turbocharger, the energy of the exhaust gases of the internal combustion engine can therefore additionally be used to drive the steam turbine, which delivers a corresponding power output according to the amount of energy available.

It is possible here to control or regulate the flow of the working fluid through the turbine housing and/or the exhaust manifold, so as to be able to vary the amount of heat taken off.

Furthermore, by controlling or regulating the flow of working fluid a desired wall temperature of the turbine housing and/or exhaust manifold can be maintained.

The dependent claims contain advantageous developments of the invention.

Thus it is possible to provide temperature sensors in the turbine housing and/or in the exhaust manifold in order to perform the processes previously explained.

It is furthermore possible to provide a shut-off valve for the working fluid in the line arrangement, in order to prevent the flow of working fluid at the inlet into the turbine housing and/or the exhaust manifold.

It is furthermore possible to provide the turbine housing and/or the exhaust manifold with an outlet for the working fluid, in order that all the working fluid can be drained out of the turbine housing and/or the exhaust manifold, if the flow into the turbine housing is deliberately blocked.

The invention furthermore allows adjustments to vehicle operating conditions, the ambient temperature or other parameters for the engine output or for the ride comfort to be optimized by varying the amount of energy taken off.

Finally it is possible to provide a preheating device for the working fluid as an additional unit, it being possible, for example, to utilize the engine coolant or the exhaust gas in coolers at other points in the system.

Further details, advantages and features of the present invention are set forth in the following description of an exemplary embodiment with reference to the drawing.

In a schematically highly simplified representation, the single FIGURE of the drawing shows a block diagram explaining the principles according to the invention.

Accordingly an exhaust turbocharger 1 of an internal combustion engine 2 is provided, the exhaust turbocharger 1 comprising a compressor 3 and a turbine 4, which is drive-connected to the compressor 3 and which is arranged in a turbine housing 5.

As the simplified representation in the FIGURE illustrates, the turbine housing 5 is provided with an evaporator 6, to which heat deriving from the exhaust gas temperature of the exhaust gases of the internal combustion engine 2 can be admitted in order to evaporate a working fluid and at least one temperature sensor 36.

In the embodiment shown, the evaporator 6 comprises three evaporation ducts 10, 11 and 12, which carry the working fluid and which are flow-connected to a line arrangement 7.

Viewed in the direction of flow S of the working fluid evaporated in the evaporator 6, a steam turbine 8, which is driven by the evaporated working fluid and delivers a power P, is arranged in a first line portion 7A of the line arrangement 7. In the line portion 7B of the line arrangement 7 adjoining the line portion 7A, a condenser 9, which recondenses the working fluid expanded in the steam turbine 8 to the liquid state and by way of a pump 13 pumps it into a line portion 7C and into an adjoining line portion 7D, is arranged downstream of the steam turbine 8. From the line portion 7D the condensed working, fluid passes back into the lines 10, 11, 12 of the evaporator 6, in order that the cyclical process previously described of evaporation, expansions, condensation and return of the working fluid into the evaporator 6 can be repeated.

In order to be able to block a return of the condensed working fluid into the evaporator 6, a shut-off valve 14 is furthermore arranged in the line portion 7D.

In the especially preferred embodiment shown, the internal combustion engine 2 is provided with an exhaust manifold 15, which is integrated into the cylinder head and which is in turn enclosed by coolant ducts 16, 17, 18, 19, 20 and 21. Like the evaporator 6, these ducts can also be embodied as an evaporator and may be operatively connected to the line arrangement 7 and its components previously described, in order to allow the alternative or additional performance of a further working fluid cycle in the form of the Rankine process initially described.

The other components of the system represented in the drawings can be seen from the following list of reference numerals, since although they may advantageously be operatively connected to the system previously described, their detailed description is not essential for the explanation of the principles according to the invention.

Besides the written disclosure of the invention, explicit reference will be made here to the graphic representation in the FIGURE, intended to supplement the disclosure.

LIST OF REFERENCE NUMERALS 1 exhaust turbocharger
2 internal combustion engine
3 compressor
4 turbine
5 turbine housing
6 evaporator
7 line arrangement
7A-7D line portions of the line arrangement 7
8 steam turbine
9 condenser
10-12 evaporation ducts
13 pump
14 shut-off valve
15 exhaust manifold
16-21 evaporator or coolant ducts of the internal combustion engine 2
22 exhaust adjuster
23 inlet adjuster
24 inlet manifold
25 high-pressure exhaust gas recirculation cooler
26 high-pressure exhaust gas recirculation valve
27 inlet throttle valve
28 air cooler
29 low-pressure exhaust gas recirculation valve
30 low-pressure exhaust cooler
31 aftertreatment device
32 exhaust throttle valve
33 exhaust pipe
34 wastegate valve
35 wastegate line

The invention claimed is:

1. An exhaust turbocharger of an internal combustion engine
    having a compressor and
    having a turbine which comprises a turbine housing
    the turbine housing comprising an evaporator to which heat deriving from the exhaust gases of the internal combustion engine can be admitted for the evaporation of a working fluid,
    the evaporator being flow-connected to a line arrangement in which a steam turbine and downstream of that a condenser are arranged, viewed in the direction of flow of the working fluid.

2. The exhaust turbocharger as claimed in claim 1, wherein the evaporator comprises a plurality of evaporation ducts integrated in the turbine housing.

3. The exhaust turbocharger as claimed in claim 1 further comprising a pump arranged in the line arrangement downstream of the condenser viewed in the direction of flow of the working fluid.

4. The exhaust turbocharger as claimed in claim 3, further comprising a shut-off valve arranged in the line arrangement downstream of the pump viewed in the direction of flow of the working fluid.

5. The exhaust turbocharger as claimed in claim 1 wherein the internal combustion engine comprises an integral exhaust manifold and an evaporator operatively connected to the line arrangement and the steam turbine and the condenser.

6. The exhaust turbocharger as claimed in claim 5, wherein the exhaust manifold comprises aluminum or cast iron.

7. The exhaust turbocharger as claimed in claim 5 wherein the exhaust manifold-comprises at least one temperature sensor.

8. The exhaust turbocharger as claimed in claim 1 wherein the turbine housing comprises aluminum or cast iron.

9. The exhaust turbocharger as claimed in claim 1 wherein the turbine housing comprises at least one temperature sensor.

10. The exhaust turbocharger as claimed in claim 1 further comprising a preheater for the working fluid.

* * * * *